US012518580B2

(12) United States Patent
So

(10) Patent No.: US 12,518,580 B2
(45) Date of Patent: Jan. 6, 2026

(54) DOOR LOCK WITH REMOTE VEIN READER

(71) Applicant: MAXSafes Security, LLC, Stuart, FL (US)

(72) Inventor: Wing On Nick So, Irvine, CA (US)

(73) Assignee: MAXSafes Security LLC, Stuart, FL (US)

( * ) Notice: Subject to any disclaimer, the term of this patent is extended or adjusted under 35 U.S.C. 154(b) by 0 days.

(21) Appl. No.: 18/955,614

(22) Filed: Nov. 21, 2024

(65) Prior Publication Data

US 2025/0078595 A1 Mar. 6, 2025

Related U.S. Application Data

(63) Continuation-in-part of application No. 18/346,400, filed on Jul. 3, 2023, which is a continuation-in-part (Continued)

(51) Int. Cl.
*G07C 9/00* (2020.01)
*G07C 9/25* (2020.01)

(52) U.S. Cl.
CPC ..... *G07C 9/00563* (2013.01); *G07C 9/00944* (2013.01); *G07C 9/253* (2020.01)

(58) Field of Classification Search
CPC . G07C 9/00563; G07C 9/253; G07C 9/00944
See application file for complete search history.

(56) References Cited

U.S. PATENT DOCUMENTS 7,245,745 B2 7/2007 Nagasaka et al.
8,229,178 B2 7/2012 Zhang et al.

(Continued)

FOREIGN PATENT DOCUMENTS

CN 105574479 5/2016
CN 105574479 A 5/2016

(Continued)

OTHER PUBLICATIONS

English Translation of KR 20070042362 (Year: 2007).*

(Continued)

*Primary Examiner* — Patrick N Edouard
*Assistant Examiner* — Eboni N Giles
(74) *Attorney, Agent, or Firm* — McHale & Slavin, P.A.

(57) ABSTRACT

A door lock controller suitable for securing a door to a dwelling or valuables inside a dwelling is provided. The door assembly may be positioned in a sidewall or top wall. The door lock controller assembly is provided with a suitable biometric lock arrangement, particularly, a finger blood vessel or palm blood vessel reader that is suitable for selectively restricting access to the interior of the dwelling or building. The finger or palm reader is preferably a mountable pod suitable for reading the finger or palm veins of a user to cause opening of the lock and thus the door. The door lock controller may be connected via wiring, Bluetooth, Zigby chip or other connection suitable to transfer sufficient data to the lock actuator to confirm the identity of the user and send an open signal to the lock actuator for opening of the latch mechanism.

15 Claims, 19 Drawing Sheets

Related U.S. Application Data of application No. 17/236,119, filed on Apr. 21, 2021, now Pat. No. 11,734,974.

(60) Provisional application No. 63/574,281, filed on Apr. 4, 2024, provisional application No. 63/501,740, filed on May 12, 2023, provisional application No. 63/368,838, filed on Jul. 19, 2022.

(56) References Cited

U.S. PATENT DOCUMENTS

| | | | | |
|---|---|---|---|---|
| 8,244,006 | B2 | 8/2012 | Yokoyama et al. | |
| 8,811,682 | B2 | 8/2014 | Kanda et al. | |
| 9,245,164 | B2 | 1/2016 | Pan et al. | |
| 10,024,081 | B2 | 7/2018 | Li et al. | |
| 10,872,221 | B2 | 12/2020 | Kumar et al. | |
| 11,017,205 | B2 | 5/2021 | Kang et al. | |
| 11,080,978 | B1 * | 8/2021 | Goldstein | G08B 13/16 |
| 11,893,773 | B2 | 2/2024 | Chao et al. | |
| 2010/0263031 | A1 * | 10/2010 | Tsuchiya | G06F 21/32 726/7 |
| 2012/0057011 | A1 | 3/2012 | Horng et al. | |
| 2019/0126815 | A1 * | 5/2019 | Morel | E05B 81/77 |
| 2019/0167159 | A1 * | 6/2019 | Dremin | A61B 5/0064 |
| 2019/0303649 | A1 * | 10/2019 | Hama | G06V 40/1365 |
| 2019/0340344 | A1 | 11/2019 | Choi et al. | |
| 2021/0272059 | A1 * | 9/2021 | Cartwright | G07F 17/12 |
| 2023/0072967 | A1 * | 3/2023 | Lv | G07C 9/00817 |

FOREIGN PATENT DOCUMENTS

| | | | |
|---|---|---|---|
| CN | 206369950 | | 8/2017 |
| CN | 206369950 | U | 8/2017 |
| CN | 208126411 | | 11/2018 |
| CN | 208126411 | U | 11/2018 |
| CN | 109903444 | | 6/2019 |
| CN | 109903444 | A | 6/2019 |
| TR | 105574479 | A | 5/2016 |
| TR | 206369950 | U | 8/2017 |
| TR | 208126411 | U | 11/2018 |
| TR | 109903444 | A | 6/2019 |
| WO | WO2016019679 | | 2/2016 |

OTHER PUBLICATIONS

English Translation of KR 20210019215 (Year: 2021).*

Hitachi, Finger Vein Authentication Technology, Oct. 24, 2024.

Conex, Philips palm vein smart door lock DDL902-MVP-11HWS, Oct. 24, 2024.

Fujitsu, PalmSecure-F Pro, Dec. 31, 2021.

Anonymous, “Fujitsu biometric authentication technology for any application”, Fujitsu, article retrieved from the Internet, pp. 1-2, (Jan. 2022).

Anonymous, “Finger vein authentication technology”, Hitachi, article retrieved from the Internet, p. 1, (2024-2025).

Anonymous, “Philips palm vein smart MVP-11HWS”, Conex, article retrieved from the Internet, pp. 1-5, (Oct. 2024).

ISR of the International Searching Authority for PCT/US2025/022473, pp. 1-3, mailed Apr. 23, 2025.

ISRWO of the International Search Report for PCT/US2025/022473, pp. 1-16, mailed Apr. 23, 2025.

* cited by examiner

DOOR LOCK WITH REMOTE VEIN READER

RELATED APPLICATIONS

In accordance with 37 C.F.R. 1.76, a claim of priority is included in an Application Data Sheet filed concurrently herewith. Accordingly, the present invention claims priority to U.S. Provisional Patent Application No. 63/574,281, entitled "DOOR LOCK WITH REMOTE VEIN READER", filed Apr. 4, 2024. The present invention also claims priority as a Continuation-In-Part of U.S. Non-Provisional patent application Ser. No. 18/346,400, entitled "STORAGE SAFE WITH REMOTE PALM READER", filed Jul. 3, 2023, which is a Continuation-In-Part of U.S. Non-Provisional patent application Ser. No. 17/236,119, entitled "SAFE WITH BIOMETRIC LOCK MECHANISM", filed Apr. 21, 2021, which issued as U.S. Pat. No. 11,734,974, on Aug. 22, 2023; and claims priority to U.S. Provisional Patent Application No. 63/368,838, entitled "STORAGE SAFE WITH REMOTE PALM READER", filed Jul. 19, 2022; and U.S. Provisional Patent Application No. 63/501,740, entitled "STORAGE SAFE WITH REMOTE PALM READER", filed May 12, 2023. The contents of the above referenced applications are incorporated herein by reference.

FIELD OF THE INVENTION

The present invention relates to a device for securing a door to a dwelling, building or room within a dwelling or building, and more particularly, to a release mechanism for a door lock operated without touching the device and utilizing vein recognition for identification of the user which may be remote.

BACKGROUND OF THE INVENTION

Owning firearms for protection is popular for many around the world. Many handgun owners and collectors would like to keep a handgun at a convenient location and ready to use in case of need. However, this would typically have the handgun located where an unauthorized person could access the gun. It also results in a handgun being available for young and/or inexperienced people who might discharge the firearm accidentally.

Handgun safety devices are known and include such things as trigger locks, cable locks, lock boxes, and the like. While effective for preventing accidental use or misuse, they all preclude the immediate availability of a handgun in a time of need.

Single and multiple gun safes (sometimes called vaults) are known. They are designed for placement on a table or in a drawer in a convenient location. Storage devices are also available for vehicles. They are often constructed in the form of a box with a lid or door. They include a lock device, such as a digital lock or key lock, which provides security to the contents of the safe by preventing the lid or drawer from opening. While effective in limiting access to the contents, they also impede access to the contents if needed in an emergency. They may not store the gun in a consistent position inside. All prior art devices either preclude fast access to the stored gun or do not effectively secure the stored gun. Thus, storage security comes at the expense of fast access.

Another problem with firearm storage devices is that, although a firearm is readily accessible from storage to an owner, it is also readily accessible to small children. The lack of an encasing or safety locks makes for an attractive nuisance to young children. Thus, there exists a need for a way to safely and securely store firearms, and in particular handguns, without the disadvantages described above.

Firearms are typically stored in a home or other building along with other valuables that an owner desires to safeguard against burglary and theft. In addition, a typical door lock requires a key or keys to open the door. In alternative devices, a number is required to be keyed into the door to unlock the door. The user's hands may be full, requiring the user to put the objects in his/her hands down to continue opening the door. Door handles are also often covered in germs and bacteria from multiple users touching the doorknob to open the door, these germs may be infectious. Thus, what is needed in the art is a door lock actuator that doesn't require the user to touch the door. The door lock should allow entry to the building without requiring the user to touch the doorknob or door handle. The lock mechanism actuator should identify the user utilizing veins in the finger or palm; the lock mechanism actuator should also include memory for retaining the vein patterns of multiple users.

DESCRIPTION OF THE PRIOR ART

StackOn, Gun Vault, Sentry Safe and Ivation are brands of handgun safes. Some use digital locks, some use key locks, and some use biometric information for security. All of the known prior art requires the user to physically touch the safe by inputting codes, fingerprint identification, keys, or the like to cause the safe to open; this system requires the safe to be mounted or stored where the user has suitable access to the safe to manually operate the lock mechanism.

Doors are also known that utilize key cards, keys, numerical inputs and the like for controlling door lock operation. The known devices all require the user to enter or manipulate something mechanical on the door lock to operate the lock and open the door.

Thus, the present door lock controller allows the user to open a door that includes the actuator built into the door. Alternatively, a door actuator may open a door that is remote from the controller in the door when the controller identifies the user. The present controller is also suitable to operate multiple doors from a single controller. Still yet, the present controller can be moved from proximity of the door and carried to other locations which may also include doors that can be opened with the same controller.

SUMMARY OF THE INVENTION

A door lock controller suitable for securing firearms or other valuables is provided. The dwelling or building is comprised of an interior compartment which is defined by a plurality of walls, such as a bottom wall, a top wall, and a plurality of sidewalls. One of the walls may be a lockable door or slide assembly. The door assembly may be positioned in a sidewall or top wall. The door lock controller assembly is provided with a suitable biometric lock arrangement, particularly, a finger blood vessel or palm blood vessel reader that is suitable for selectively restricting access to the interior of the dwelling or building. The finger or palm reader is preferably a mountable pod suitable for reading the finger or palm veins of a user to cause opening of the lock and thus the door. The door lock controller may be connected via wiring, Bluetooth, Zigby chip or other connection suitable to transfer sufficient data to the lock actuator to confirm the identity of the user and send an open signal to the lock actuator for opening of the latch mechanism.

Accordingly, it is an objective of the present invention to provide a door lock controller that utilizes biometric data, including blood vessels in the fingers or palm of the hand.

It is a further objective of the present invention to provide a door lock controller with the non-electronic manual means to unlock the door to provide access to the interior.

It is yet another objective of the present invention to provide a door lock controller with a latch mechanism that allows for re-locking of the door manually by simply closing the door.

It is a still further objective of the invention to provide a door lock controller with a digital imaging system that utilizes near infrared light to create a digital image that can be stored in memory in the imaging system.

It is still yet a further objective of the present invention to provide a door lock controller that is compact, and which securely maintains a locked door while allowing easy access to the dwelling or building upon biometric finger or palm recognition data obtained from an authorized user.

Still another objective of the present invention is to provide a door lock controller that uses an electronically operated locking mechanism that selectively secures a door in a secure position, releasing the door lock upon finger or palm blood vessel recognition of the user.

Still yet another objective of the present invention is to provide a palm recognition module that sends the palm data to the lock actuator, wherein the door lock includes the software and hardware regarding the recognition data and the decision is made at the door lock actuator portion whether to open or not.

An even further objective of the present invention is to provide a door mounted finger or palm recognition module that includes the software and hardware to compare the palm to a database where the decision is made to provide an open signal to the lock actuator.

Yet another objective of the present invention is to provide a remote door lock controller with a finger or palm vein reader that can be mounted in various orientations for wireless communication to the door lock actuator.

Still yet another objective of the present invention is to provide a door lock controller having a finger or palm vein reader that can be moved with respect to the door and carried into sufficiently close proximity to the door to allow the door to be opened or unlocked for opening.

An even further objective of the present invention is to provide a mount for a door lock controller having a finger vein reader or palm vein reader that can be secured to surfaces with magnetics, adhesives or mechanical means.

Still a further objective of the present invention is to provide a door lock controller having palm or finger blood vessel identification that can operate more than one door.

An even further objective of the present invention is to provide a door lock controller wherein the door lock controller contains a portion of the identifying information of the user and the door lock actuator contains a portion of the identifying information so that only the door actuators that include the proper identifying information are opened.

Still a further objective of the present invention is to provide a door lock controller that can store identifying information of more than one user.

Other objects and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE FIGURES

FIG. 19 is a front perspective view illustrating the door lock controller having finger and palm vein recognition secured to the dash of a vehicle for opening a door to a building, gate or the like;

FIG. 20 is a front perspective view illustrating the door lock controller having finger and palm vein recognition secured to the vent blades of a vehicle for opening a door to a building, gate or the like;

DETAILED DESCRIPTION OF THE INVENTION

Figure 1:
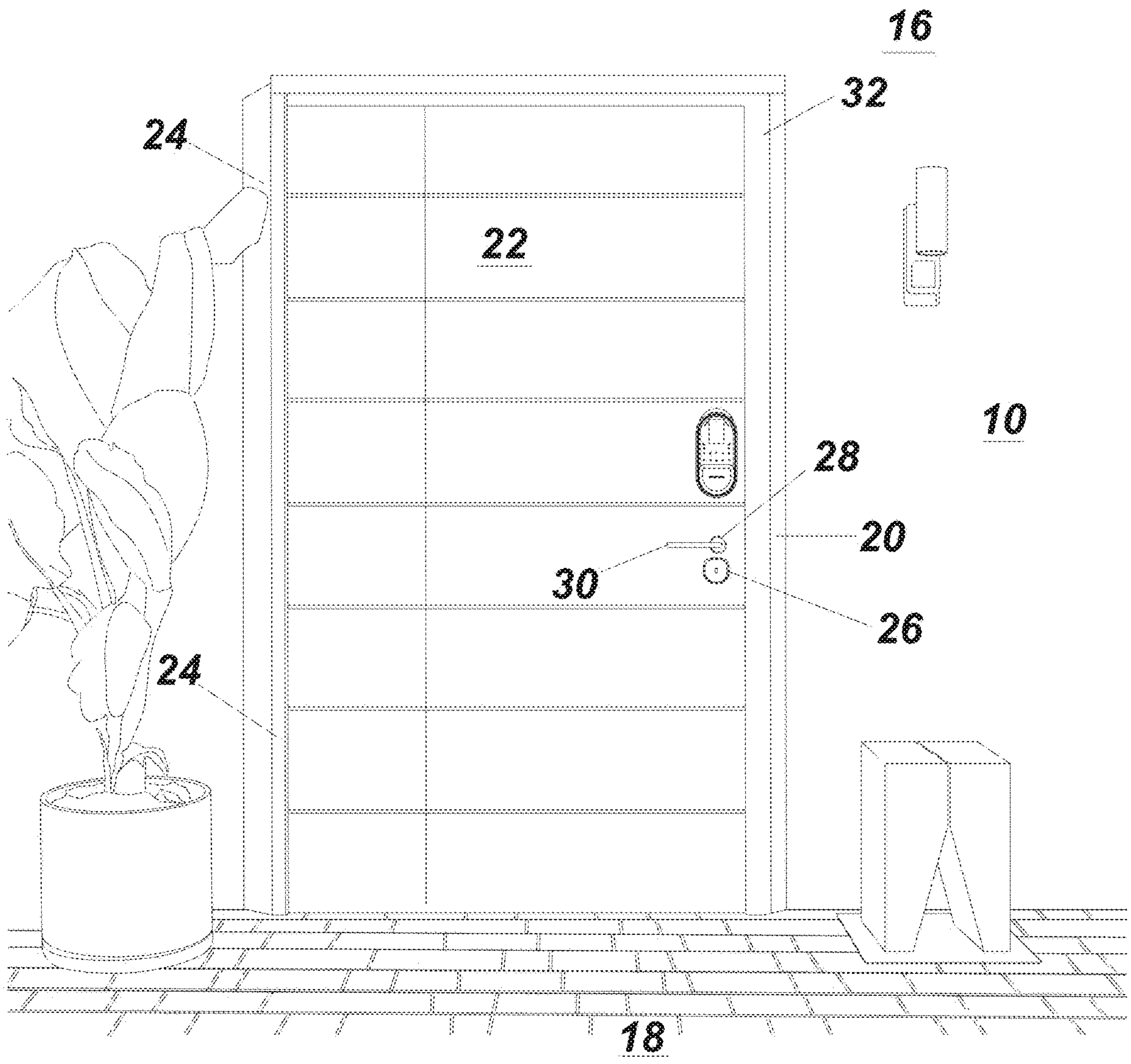
FIG. 1 is a front view of a door lock controller utilizing finger vein or palm vein recognition, which may be remote, as a key for opening the door.
Figure 2:
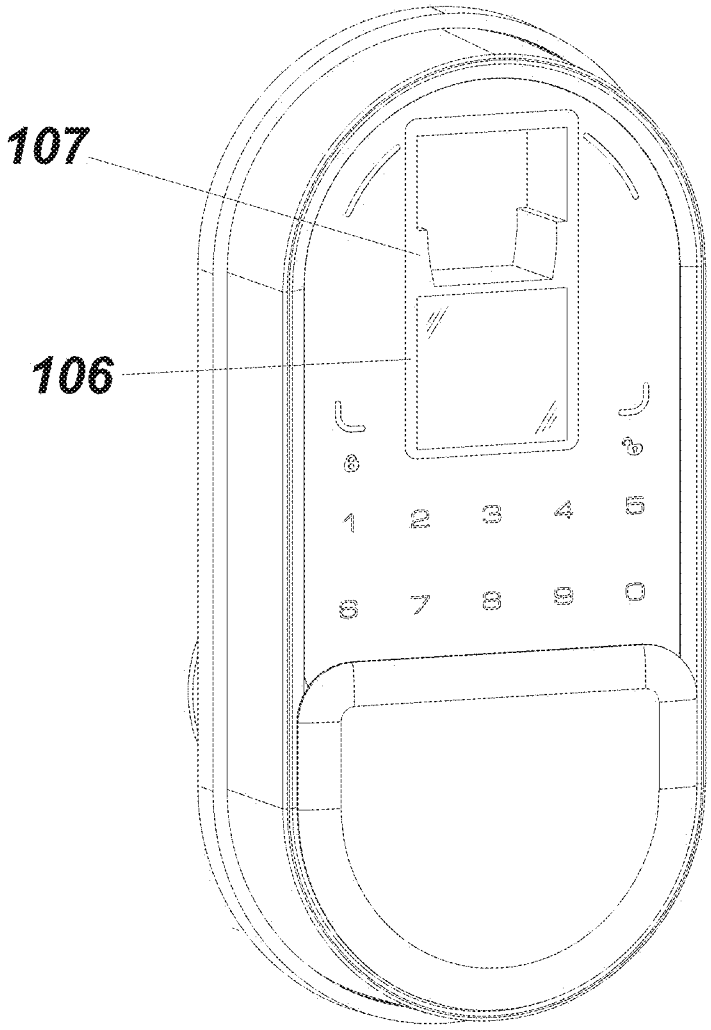
FIG. 2 is a perspective view of one embodiment of the door lock controller having a palm and finger vein scanner attachable to a door.
Figure 3:
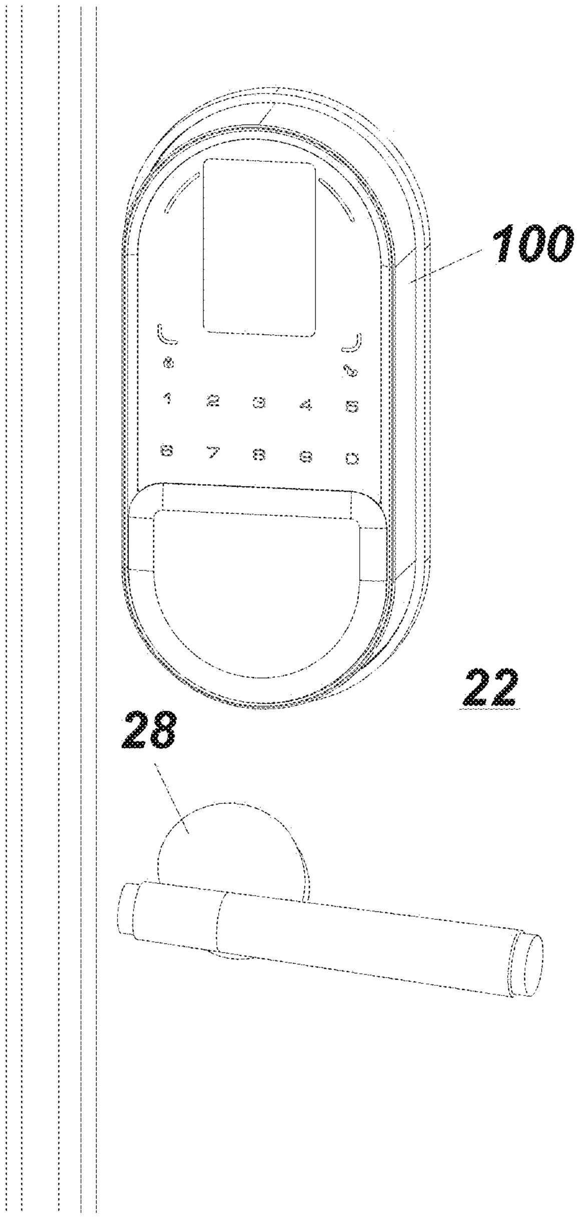
FIG. 3 is a perspective view illustrating the door lock controller secured to a door for operating a deadbolt or door latch.
Figure 14:
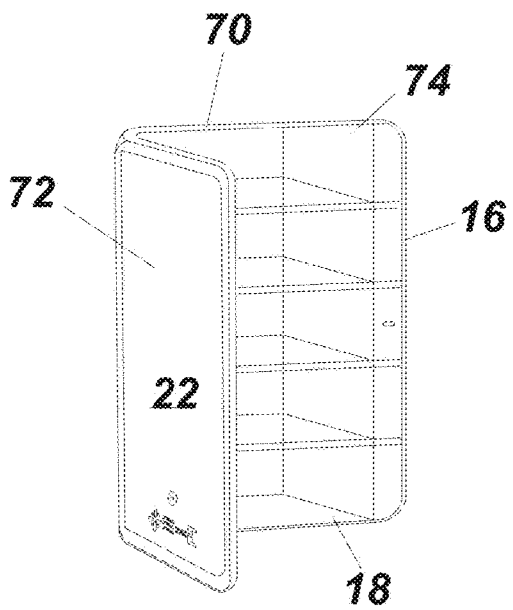
FIG. 14 is a perspective view of the door lock controller with vein reader incorporated into a medicine cabinet, illustrated with the cabinet door in an open position.
Figure 13:
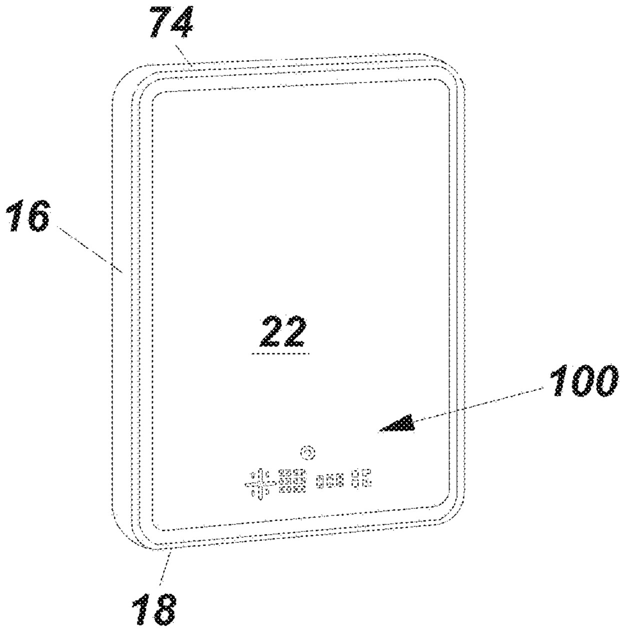
FIG. 13 is a perspective view of the door lock controller with vein reader incorporated into a medicine cabinet.
Figure 12:
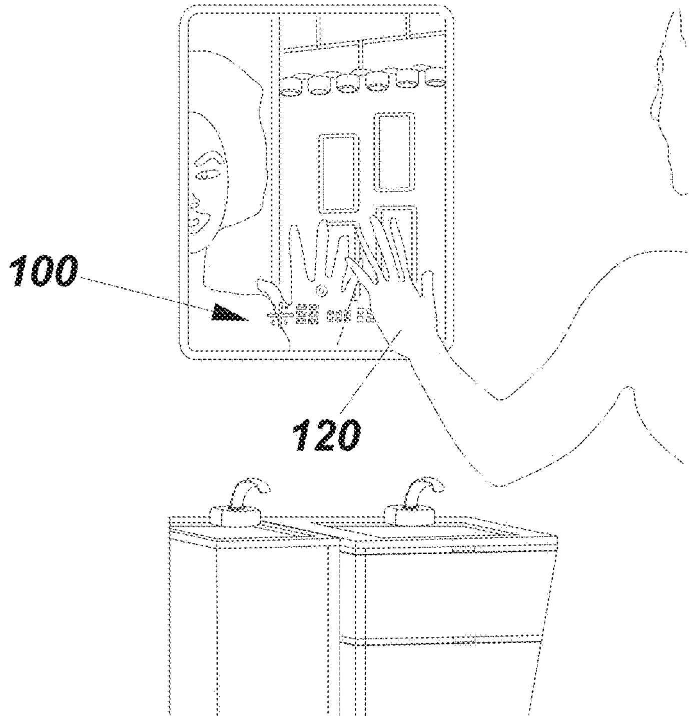
FIG. 12 is a perspective view of the door lock controller with vein reader incorporated into a medicine cabinet, illustrated reading a user's palm veins.
Figure 15:
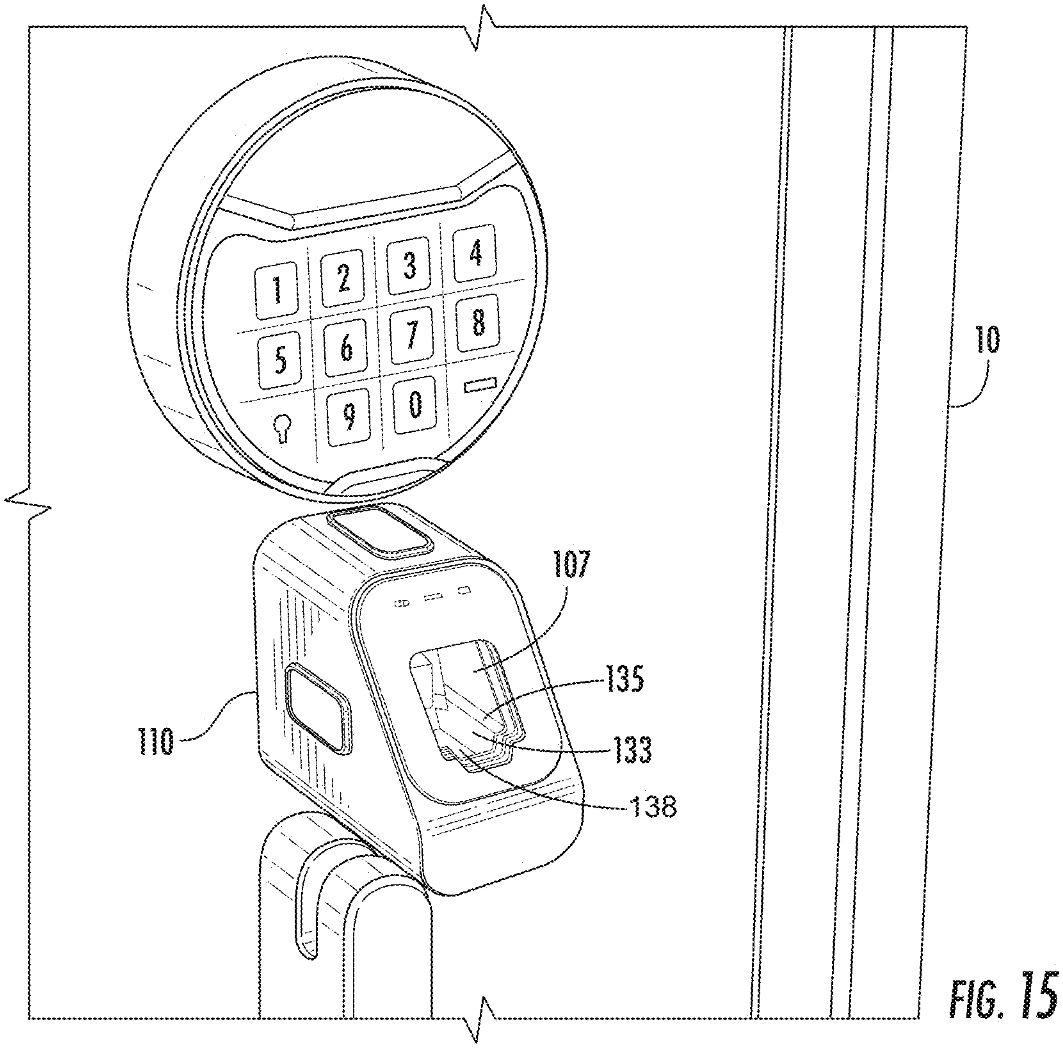
FIG. 15 is a partial front perspective view illustrating one embodiment of the door lock controller including a finger positioner.

Referring generally to the Figures, a dwelling, building or other enclosed space, such as an enclosure or safe designated generally 10, is illustrated. The dwelling, building or enclosure 10 includes a plurality of side walls 16, a floor 18 and a top panel to enclose an open space. In the illustrated building 10, the side walls 16, floor 18 and ceiling are connected together to form a storage chamber containing valuables, which may include humans or animals, as well as inanimate objects. An opening 20 is provided in one of the side walls 16, floor 18 or ceiling (top panel) for providing a door 22 to provide ingress and egress to the interior space. The door 22 is preferably mounted on hinges 24 or tracks which allow the door to be rotated, pivoted or slid for opening and closing as is currently known in the art. It should be noted that sliding doors, pocket doors, track doors or the like may be used without departing from the scope of the present invention. For maintaining the door in a closed and secured position, the door 22 may be provided with a lock mechanism 26 and/or a latch mechanism 28. The latch mechanism 28 is generally suitable for retaining the door 22 in a closed and unlocked condition and openable by rotation of a knob or handle 30 or the like, which is constructed and arranged to operate the latch in a manner that allows the door to be opened and closed. The lock mechanism 26 is generally constructed and arranged to selectably prevent the door 22 from being opened, even upon rotation of the knob or handle 30. However, the lock mechanism 26 in some embodiments of the present invention allow the door to be closed when locked, preventing reopening of the door 22 without release of the lock mechanism 26. The latch mechanism 28 and the lock mechanism 26 can be mounted at any suitable position around the periphery 32 of the door 22 that is suitable to selectively maintain the door 22 in a closed position, while allowing it to be moved to an open position, either manually or automatically. If need be, the door 22 can be associated with means to effect assisted opening, as for example a spring, gas spring, or the like (not shown). The dwelling or building 10 and door 22 can be made of any suitable material, such as wood, metal, concrete, plastic or suitable combinations thereof. It should also be noted that the term door 22 includes garage doors, mailbox doors, safe doors, medicine chest doors or a door on any other enclosed structure, container or safe which may need to be locked to prevent unauthorized entry into the enclosure or dwelling. In the embodiment illustrated in FIG. 1, the door 22 is hingedly secured to the sidewalls 16 or top panel 74 for movement between an open position and a closed position; wherein the user has access to the goods stored within the dwelling or enclosure 10 when the door is in the open position and access is denied in the closed position. FIGS. 12-14 illustrate a medicine cabinet 70. In this embodiment, the enclosure, 10 is represented as a medicine cabinet 70 including a mirror 72. This embodiment includes a hinged door 22 without departing from the scope of the invention, and includes secured sidewalls 16, a floor 18, a top wall or panel 74, etc., as described above, to prevent unwanted entry into the medicine cabinet 70, and thus access to the goods stored therein without proper actuation of the lock mechanism 26. It should also be noted that the palm or finger vein reader may be positioned behind a mirror with camera and lights directed through the mirror or clear portions of glass comprising the mirror and this same construction may be utilized in vehicles utilizing the rear view mirror whereby the lock controller would be completely hidden from persons not knowing the scanner was hidden there. In this manner, the user could simply hold their hand or finger in front of the camera to scan a finger or hand to open a desired lock.

Still referring generally to the figures, the present door lock controller 100 utilizes biometric information to effect opening of a locked door 22 by operation of the lock mechanism 26. Palm 120 or finger 121 blood vessel (veins and arteries, herein individually and collectively referred to as vessels for convenience unless otherwise noted) identification is a form of biometric identification technology. Biometric identification using blood vessels provides higher security performance than the traditional identity authentication technique of fingerprinting. Vessels in the finger and palm of the hand can be imaged using infrared or near infrared light (preferably a wavelength of approximately 750 nm to about 950 nm) since a hemochrome, such as hemoglobin, absorbs or otherwise resists transmission of near infrared light therethrough, while adjacent tissue allows a higher transmission of the light, thereby providing image contrast with other tissue, allowing the vessels to be imaged, compared and identified.

In the identification process, due to palm thickness variations within the hands of various people, reliable imaging can be difficult. Hand movement and/or positioning during imaging can also present problems. Interference with imaging caused by adjacent tissue, such as muscle and bone, can create image noise, making it difficult to image the vessels for comparison and for creating the base image for storage for future comparison.

The present invention improves image quality, and hence accuracy of comparison to authenticate the biometric image as being proper to confirm a match to effect unlocking. The below described system can include a plurality of modules, a palm positioner 106 or a finger positioner 107, a light irradiation intensifier, and an image enhancement device. The palm positioner 106 or finger positioner 107 helps with controlling the finger and palm angles of pitch and skew and rotational deviation angle of the palm 120 or finger 121. The intensifier can be irradiated by a condenser to help illuminate the palm with improved uniformity of light intensity over the view field. An image enhancement device can utilize a catoptric system to obtain improved marginal information of the palm 120 and finger 121 through a longer light path for improved image contrast.

Figure 4:
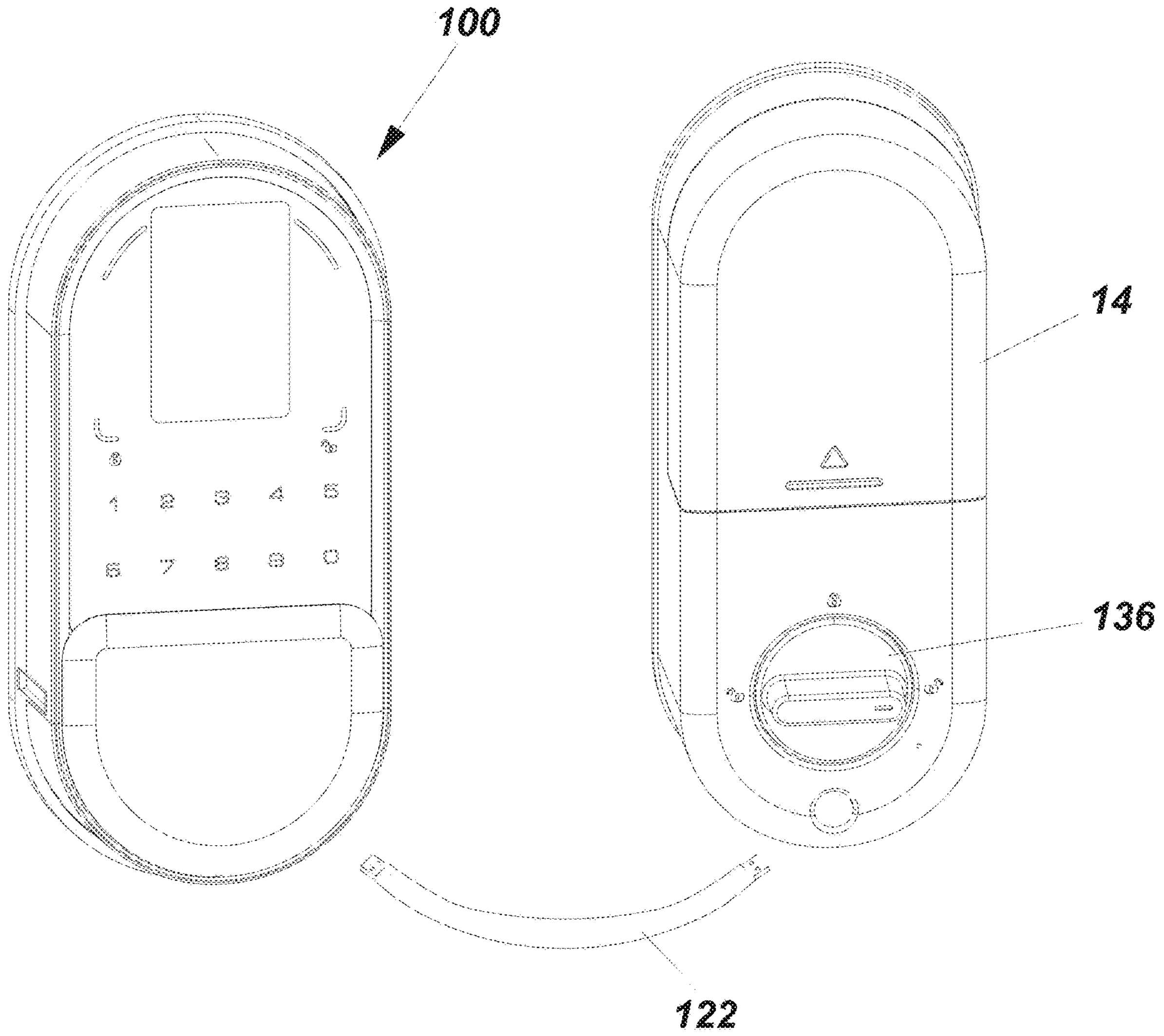
FIG. 4 is a perspective view illustrating the door lock controller with vein reader and the separate lock actuator.
Figure 8:
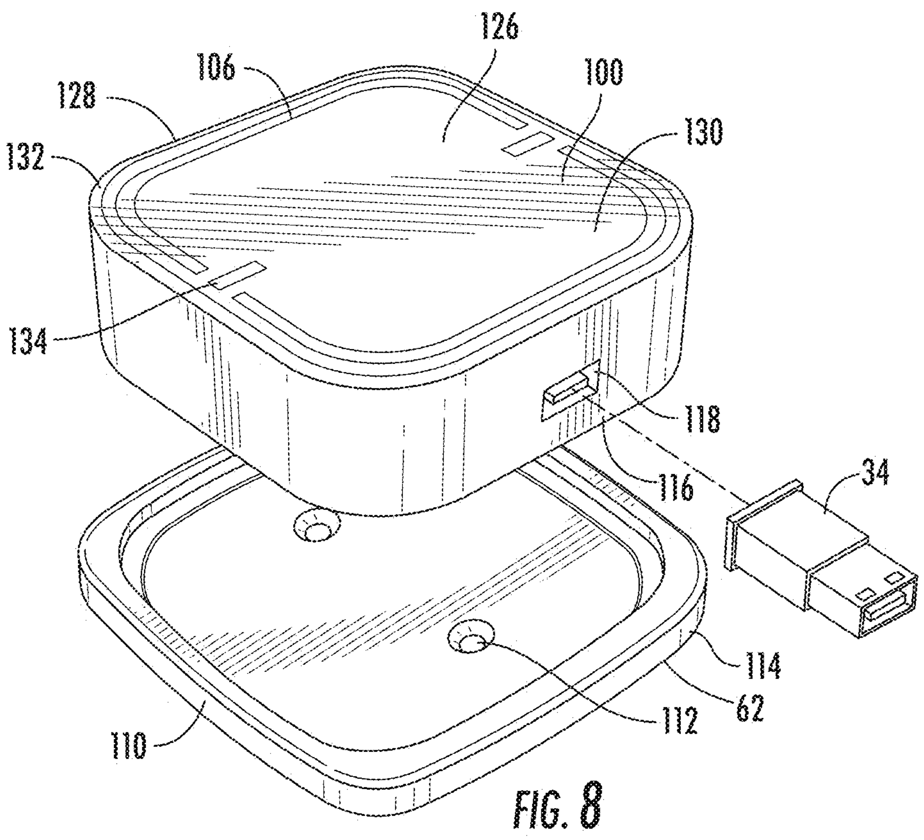
FIG. 8 is a top left front perspective view, partially exploded, of the door lock controller, a door lock controller mount, and a communication key.
Figure 9:
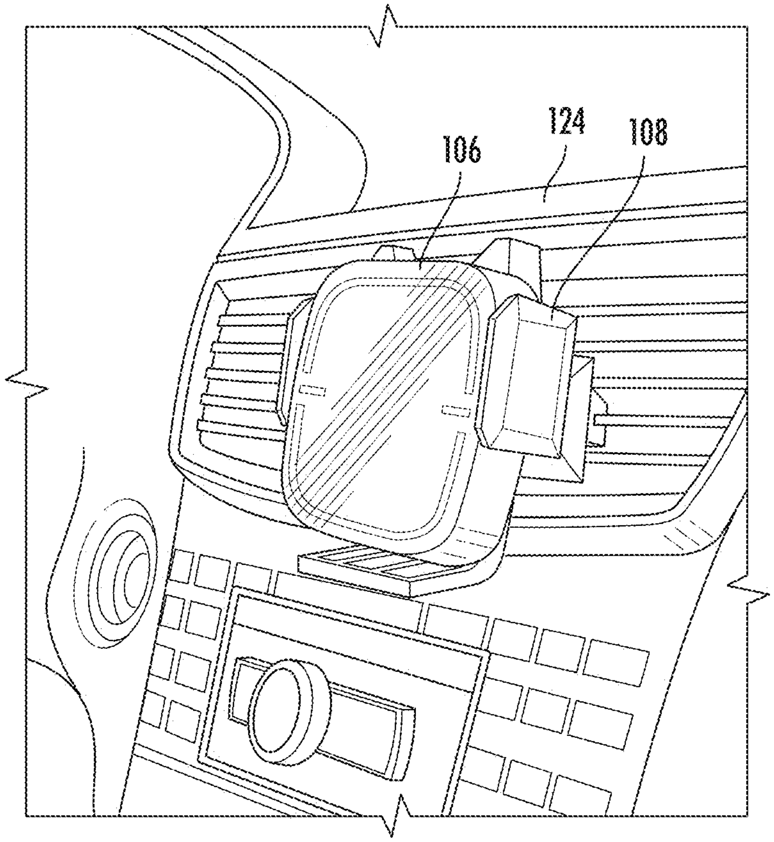
FIG. 9 is a front right perspective view of the door lock controller illustrated secured to the door lock controller mount in a vehicle.
Figure 10:
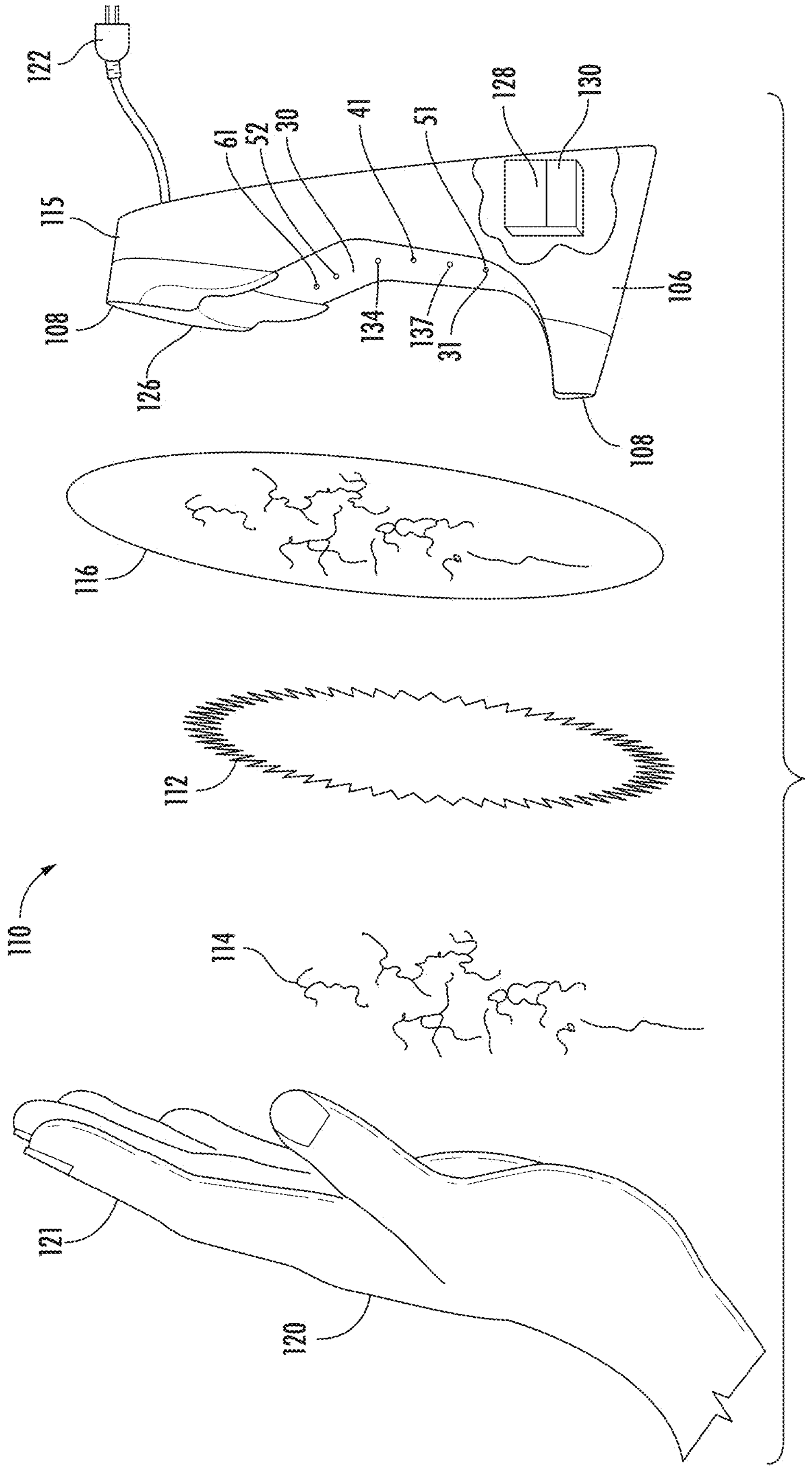
FIG. 10 is a schematic view illustrating the reading of the user's palm veins.
Figure 11:
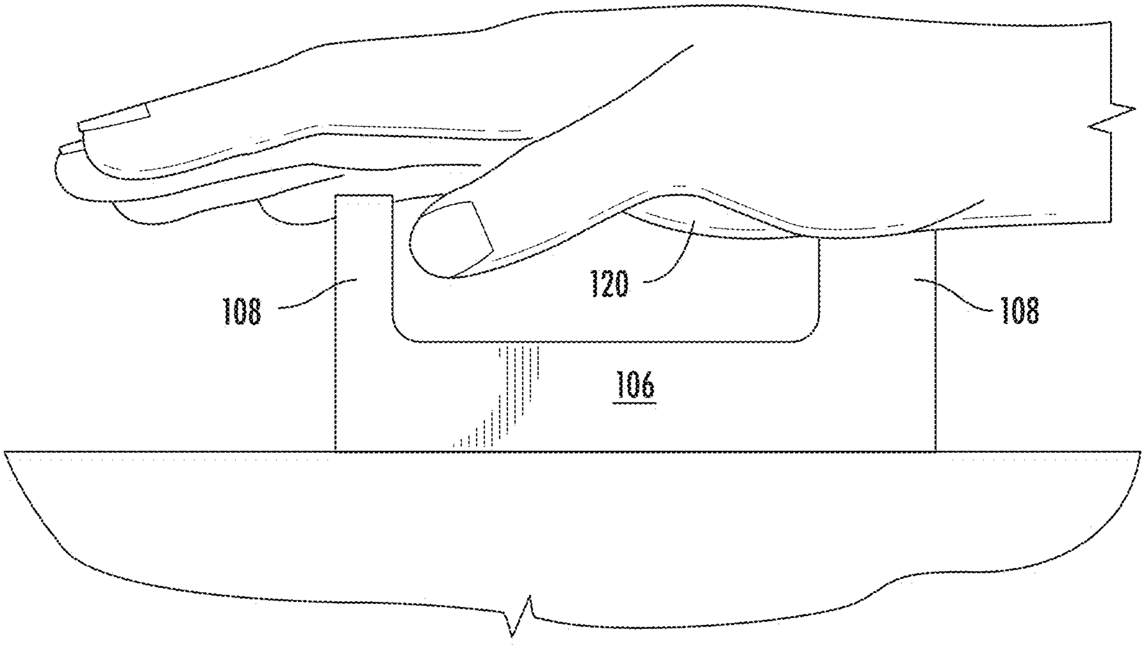
FIG. 11 is a partial side view of one embodiment of the door lock controller with a palm in position for reading palm veins.
Figure 16:
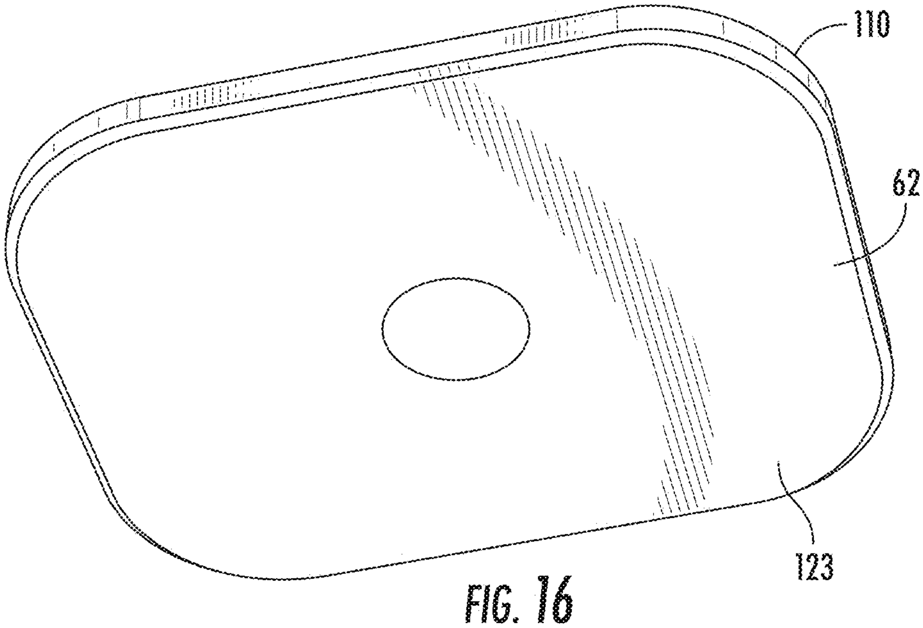
FIG. 16 is a back perspective view of a mounting plate for the door lock controller illustrating adhesive on the back side for attachment of the mounting plate to a surface.
Figure 17:
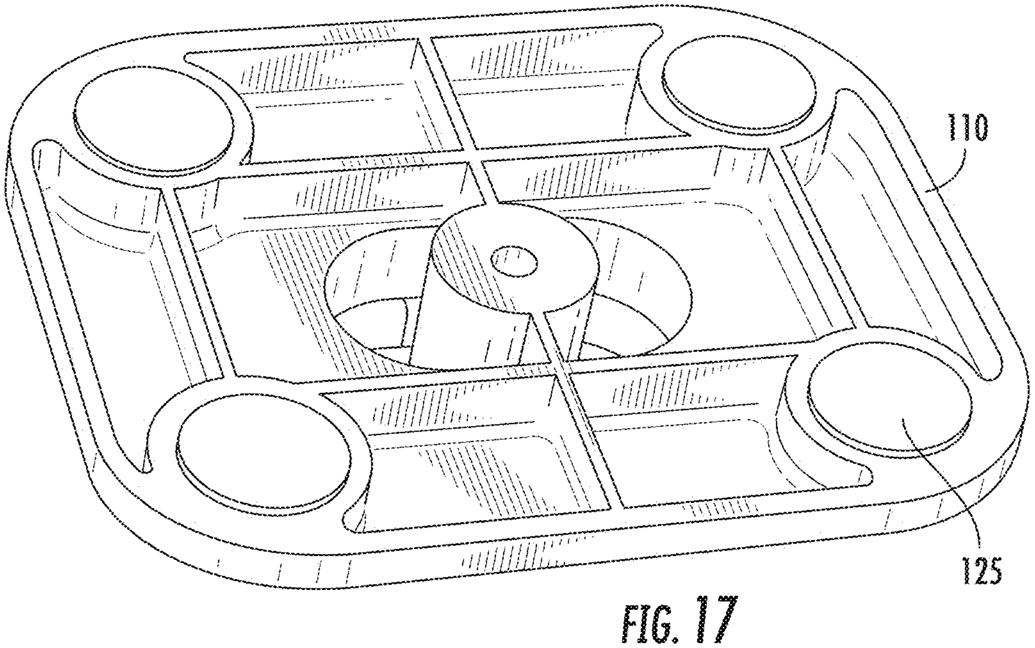
FIG. 17 is a back perspective view of a mounting plate for the door lock controller illustrating magnets on the back side for attachment of the mounting plate to a surface.
Figure 18:
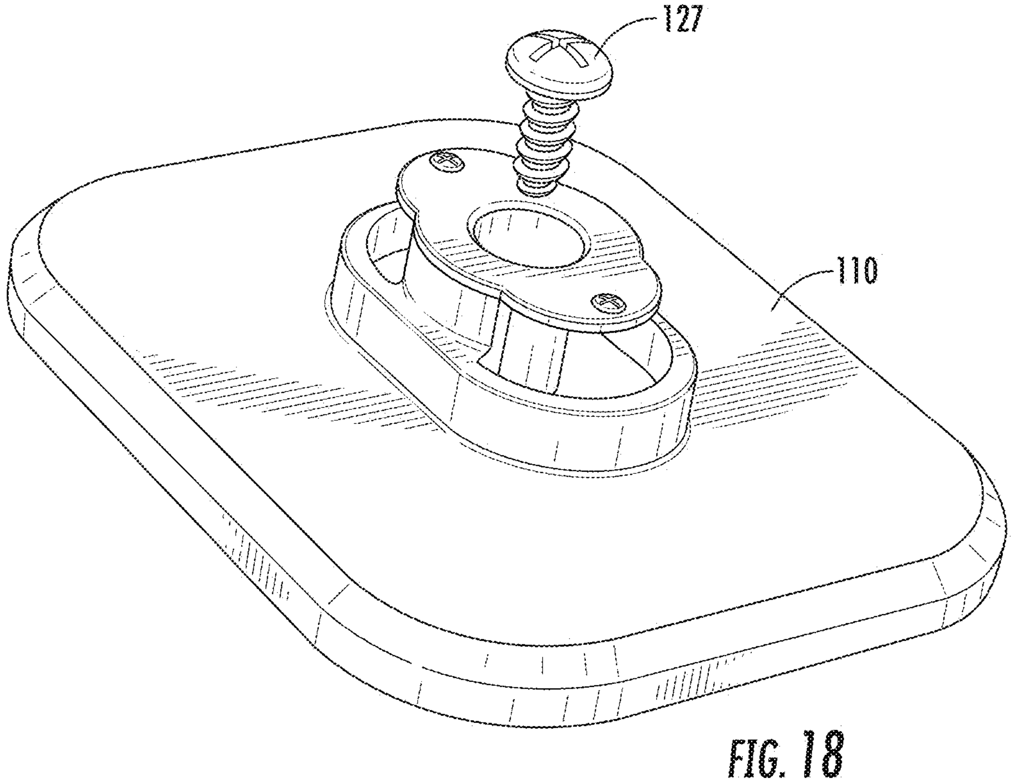
FIG. 18 is a back perspective view of a mounting plate for the door lock controller illustrating a fastener for attachment of the mounting plate to a surface.
Figure 19:
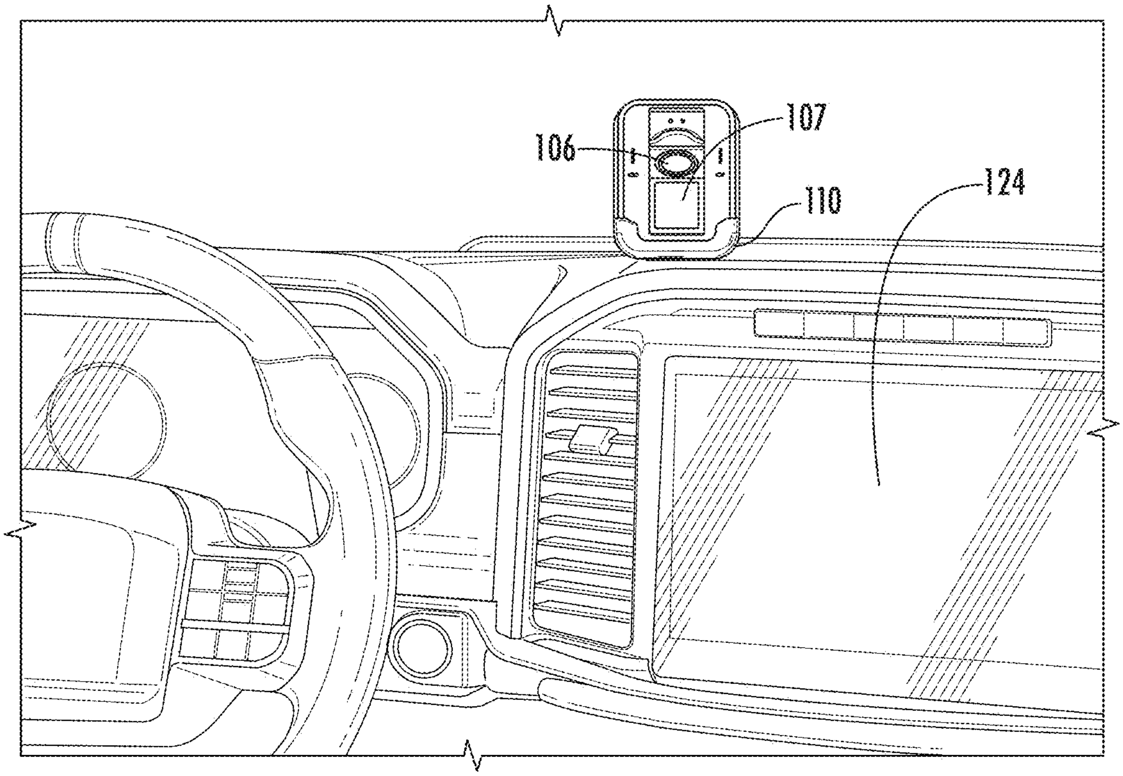
Figure 20:
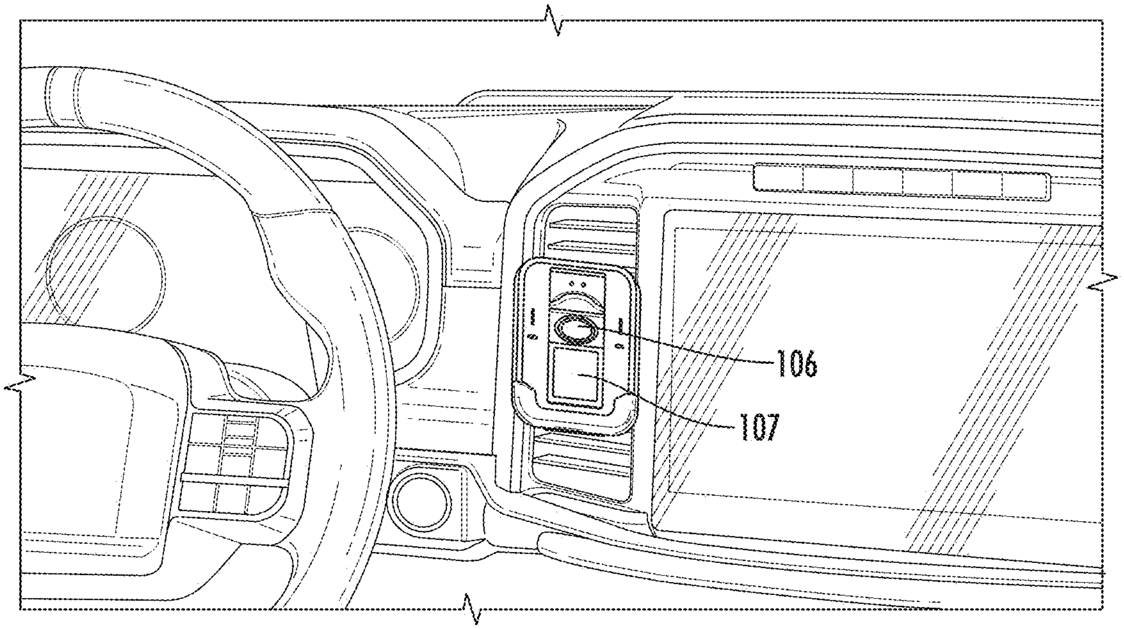
Figure 21:
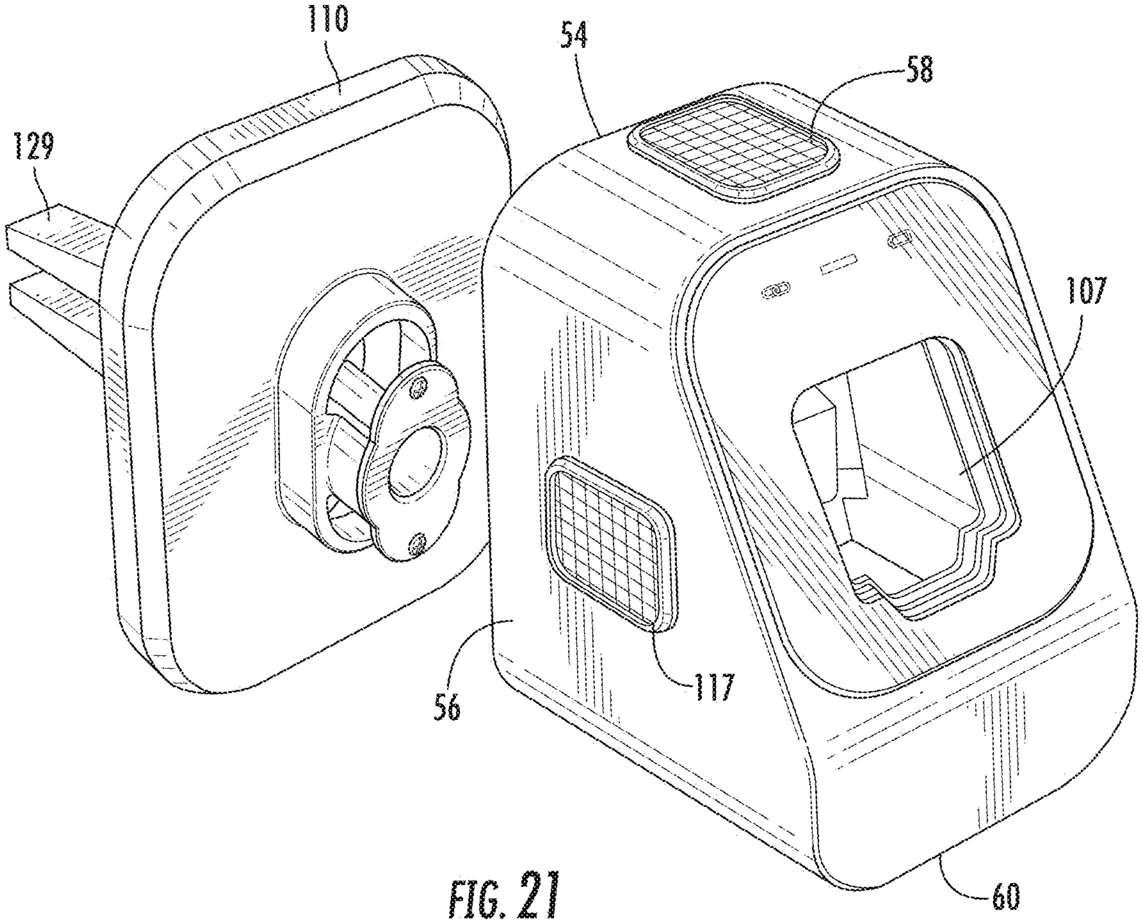
FIG. 21 is a back perspective view of a mounting plate for the door lock controller illustrating vent fingers for attachment of the mounting plate to an automotive vent.
Figure 22:
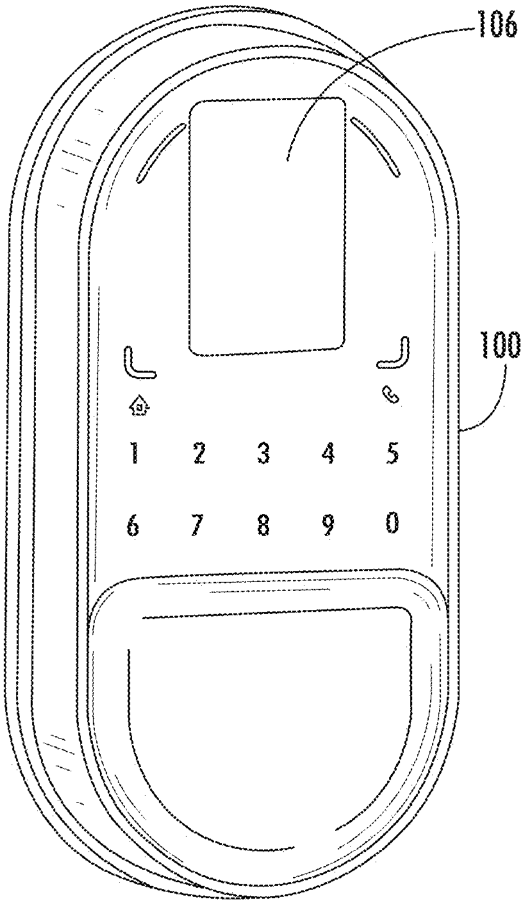
FIG. 22 is a front perspective view of one embodiment of the palm vein positioner door lock controller.
Figure 23A:
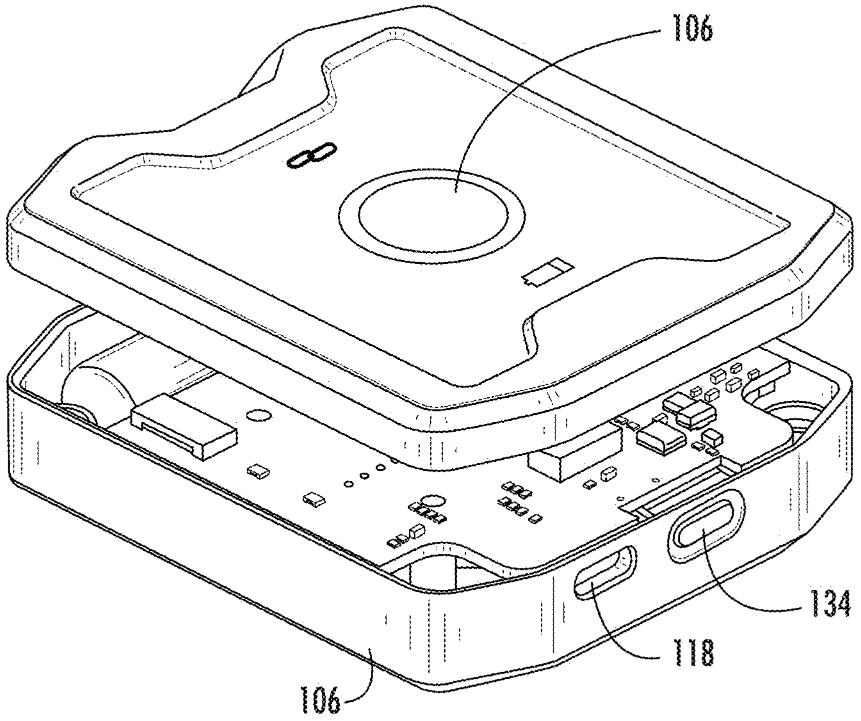
FIG. 23A is a top front right perspective view partially exploded illustrating one embodiment of the palm positioner and palm vein reader.
Figure 23B:
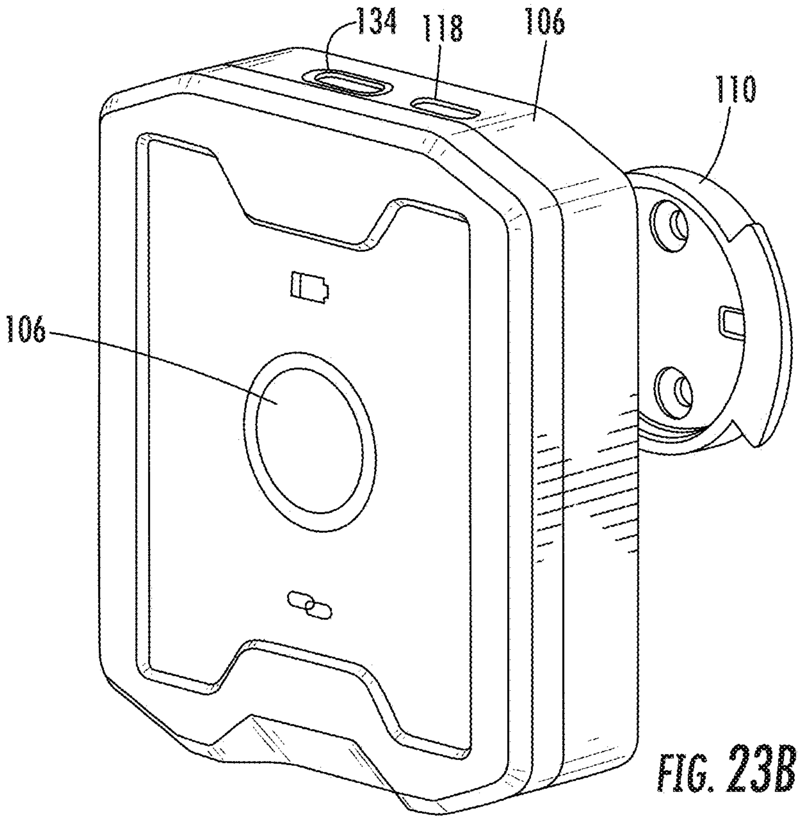
FIG. 23B is a top front right perspective view of the palm positioner shown in FIG. 23A illustrated with a bayonet style mounting plate.
Figure 24A:
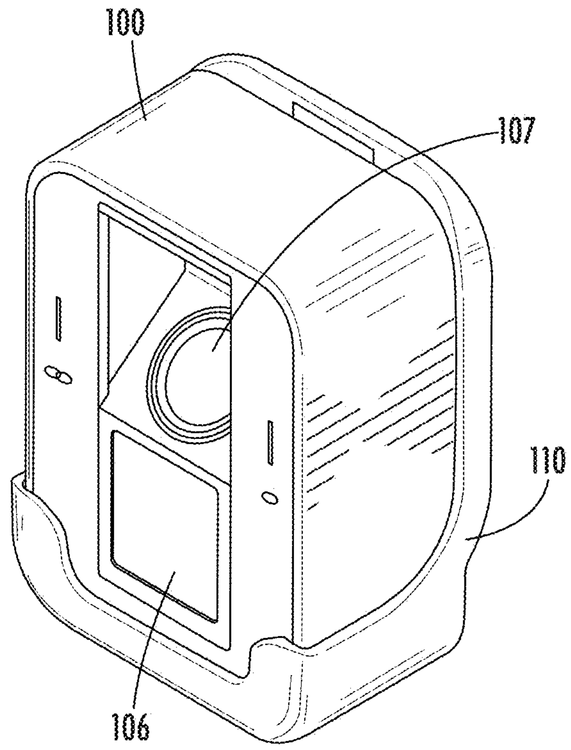
FIG. 24A is a top front right perspective view of a combination finger and palm vein reader secured within a mounting plate for remote mounting.
Figure 24B:
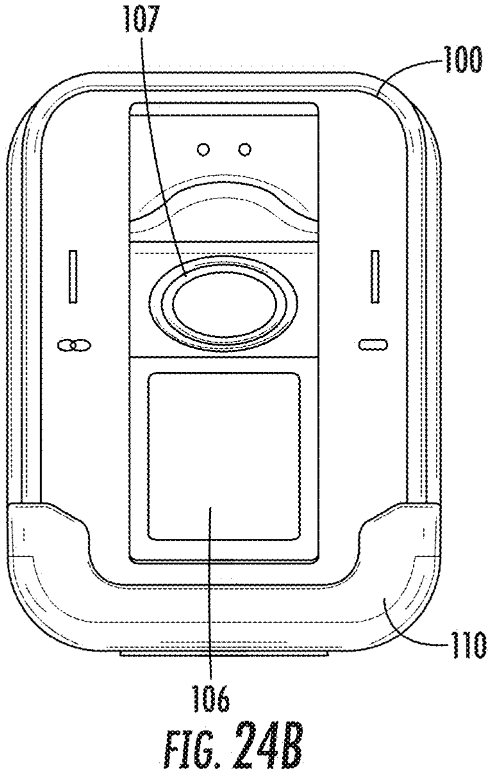
FIG. 24B is a front view of the combination finger and palm vein reader secured within a mounting plate for remote mounting.
Figure 24C:
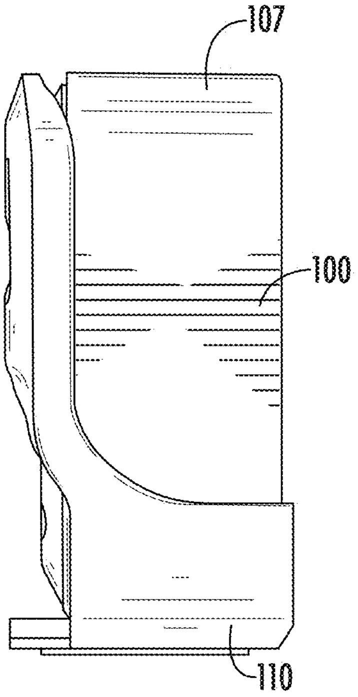
FIG. 24C is a right side view of the combination finger and palm vein reader secured within a mounting plate for remote mounting.
Figure 24D:
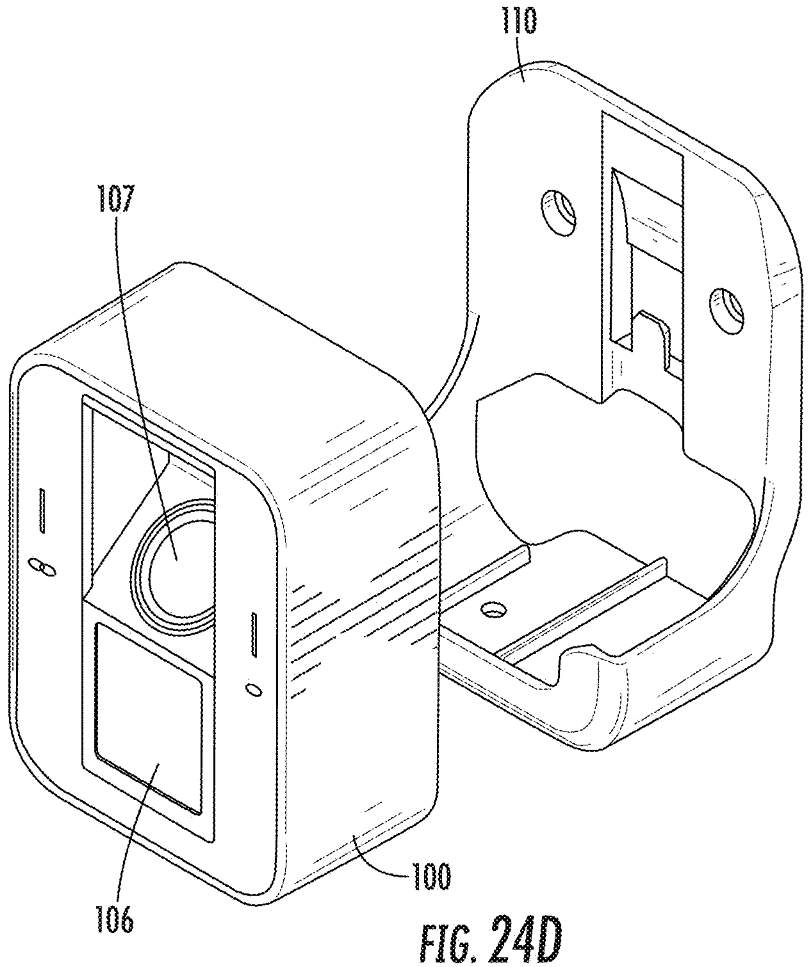
FIG. 24D is a top front right perspective view of the combination finger and palm vein reader illustrated removed from the mounting plate for use.

Still referring generally to the figures, the biometric identification system for the door lock controller 100 includes a palm positioner 106 or finger positioner 107 which functions as a housing for the biometric identification system. The palm and finger positioner 106, 107 may include a mounting plate 110 (FIG. 8), which may include palm positioning posts 108 (FIGS. 10-11) that cooperate with the user's hand to position the palm 120 in a reading position. An alternative mounting plate 110 may be constructed as a mounting plate having a first side 61 constructed to interlock with a back surface 54, side surface 56, top surface 58, or bottom surface 60 of the palm or finger positioner 106, 107, while a second side 62 of the mounting plate 110 may include adhesive 123 (FIG. 16), magnets 125 (FIG. 17), a fastener 127 (FIG. 18), or vent fingers 129 or the like (FIG. 21), which allows the palm or finger positioner 106, 107 to be attached to most any surface. A twist lock, snap locks, interference fits, adhesive, fasteners or the like may be provided to allow the mounting plate 110 to be interlocked with any of the plurality of surfaces provided on the various walls of the palm positioner 106 or finger positioner 107. In this manner, the palm positioner 106 or finger positioner 107 can be positioned in an easily accessible position to read the palm 120 or finger 121 of the user and open a remotely positioned door 22 to allow access to the interior space of the dwelling or building 10. In a most preferred embodiment, the palm positioner 106 or finger positioner 107 is constructed to include a data port 118 (FIG. 8) that is suitably constructed to cooperate with a dongle 34 or cord 122 for operational control of the lock actuator 14. When connected to the dongle 34, the palm positioner 106 may be mounted within radio range of the dongle 34, which is constructed and arranged to electrically communicate with the door 22 having a door lock actuator 14 for operation thereof. In this manner, the door lock controller 100 can be hidden from view of others and still provide easy access to the user for operation by the user to provide access to the contents of the dwelling or container. This is a distinct advantage over prior art devices where the user must provide a finger or a code input directly to the door lock for identification. This construction also allows a user to provide access to a person knocking at the door from a remote position. This feature is enhanced with the use of cameras which are readily accessible for home use. Thus, the user can buzz someone into the dwelling from the living room of the dwelling or from their vehicle without getting up to personally open the door. This construction provides a distinct advantage over requiring the input of a code or providing biometric data to a door lock device. With the present device, the door lock controller 100 may be positioned at an easily accessible position, such as a vehicle dash panel 124, while the door 22 is positioned outside of the vehicle. This allows the user to unlock the door 22 to his/her dwelling when parking the car in the driveway or garage. It should be noted that a cord 122 (FIG. 4) connection to the door lock controller 100 provides the same remote positioning with respect to the door lock actuator 14 and the door 22; it simply requires a cord 122 to extend between the two devices. It should also be noted that when the cord 122 (FIG. 4) is utilized to connect the door lock actuator 14 and the door lock controller 100, power may be supplied to the door lock controller 100 from the door lock actuator 14 and its power supply or visa-versa without departing from the scope of the invention. Alternatively, a second power port 131 (FIG. 5) may be provided to charge and/or power the door lock controller 100. The door lock controller 100 is preferably constructed and arranged to utilize batteries for power and sleep between uses to conserve battery power and, upon human contact being made to the palm or finger positioner 106, 107, the door lock controller 100 switches to an "on" mode for a predetermined time period, wherein, when a palm 120 is positioned across a front face 126 of the palm positioner 106, the palm positioner 106 reads the palm veins in an attempt to identify the user as someone that should be granted access to the contents of the dwelling or building 10; the same functions being completed for the finger vein positioner 107.

Still referring generally to the figures, operation of the door lock controller 100 and door lock actuator 14 are described. The door lock controller 100 is operably connected to the door lock actuator 14 for operation of the door lock mechanism 26, and includes an imaging system that is provided with an imaging module 128, and a palm positioner 106 or finger positioner 107, operably associated with one another to provide biometric information for palm or finger control image storage and matching to effect unlocking of the door 22; whereby a radio or direct signal is sent to the door to cause the lock mechanism 26 of the door 22 to unlock. The door 22 may open automatically, or it may require the user to move a latch mechanism 28 to allow for door opening.

The palm positioner 106 may include a pair of palm positioning posts 108 for the receipt of the base of the user's fingers 121 for positioning the palm 120 for imaging, while the finger positioner 107 is provided with an aperture 133 having prongs 135 that position the finger 121 away from the bottom scanning surface 138 to reduce deformation of the finger surface during scanning. The palm positioner 106 and finger positioner 107 are provided with a radiation source, preferably LED lights, positioned for irradiating a palm 120 or finger 121 with infrared or near infrared light while positioned on the palm positioning posts 108 or finger prongs 135. A vessel control image 116 is formed as a digital image and stored within internal memory for comparison to an authorized vein image 114.

The door lock controller 100 includes an imaging module 128 that is provided with a radiation source in the form of an LED to provide radiation 112 with an intensity sufficient to pass through a palm 120 placed upon the palm positioning posts 108 or a finger placed 121 on the prongs 135 and be digitally recorded by a camera 137, described below. Preferably, the light source includes an LED array 31 that emits light toward the palm and the camera directly, or via reflections as described below. The light that impinges on the palm 120 or finger 121 is in the infrared or near infrared spectrum, and preferably with a wavelength in the range of between about 750 nm and about 950 nm. Light in this wavelength band is absorbed and/or reflected by the blood in the blood vessels, making the vessels darker in the image than the surrounding tissue, revealing details in shape and structure, such as connections of the vessels adequate for imaging and analyzing them. The wavelength of light can be provided by the LED's light source directly and/or through the use of an optical filter 51 configured for near infrared light transmission.

The palm positioner 106, as well as the finger positioner 107, each includes a switch 134 which will be activated by the presence of the digit in a desired position for initiating the imaging process which may be a proximity switch that does not require actual physical contact. The switch 134 is connected to the door lock controller 100 that can include a processor programmed to provide control of the imaging and matching processes, and can include memory, both primary and secondary, for the processing of data and permanent storage of image data for comparison/matching. The switch 134 can be of any suitable type, such as a mechanical microswitch or a proximity switch. Preferably, the switch 134 is a proximity switch, positioned to sense or engage a desired portion of the user's palm or finger. The switch 134 can also be mounted adjacent to the palm positioner 106 or finger positioner 107. The door lock controller 100 is suitably powered, as with a battery and/or power cord 122 such as USB. The palm positioning posts 108 and finger positioning prongs 135 are constructed and arranged to help position and limit movement of the palm and finger in an acceptable orientation of skew, pitch and rotational angular positions. In other embodiments, the proximity sensor allows the user to place their palm in front of the door lock controller, after which the door lock controller automatically scans the palm and checks for matches to unlock the door. The door lock controller 100 can be provided with a reset function that will allow for the deletion of one or more stored vessel images in order to revoke access to a person and prevent them from opening the door 22.

Figure 5:
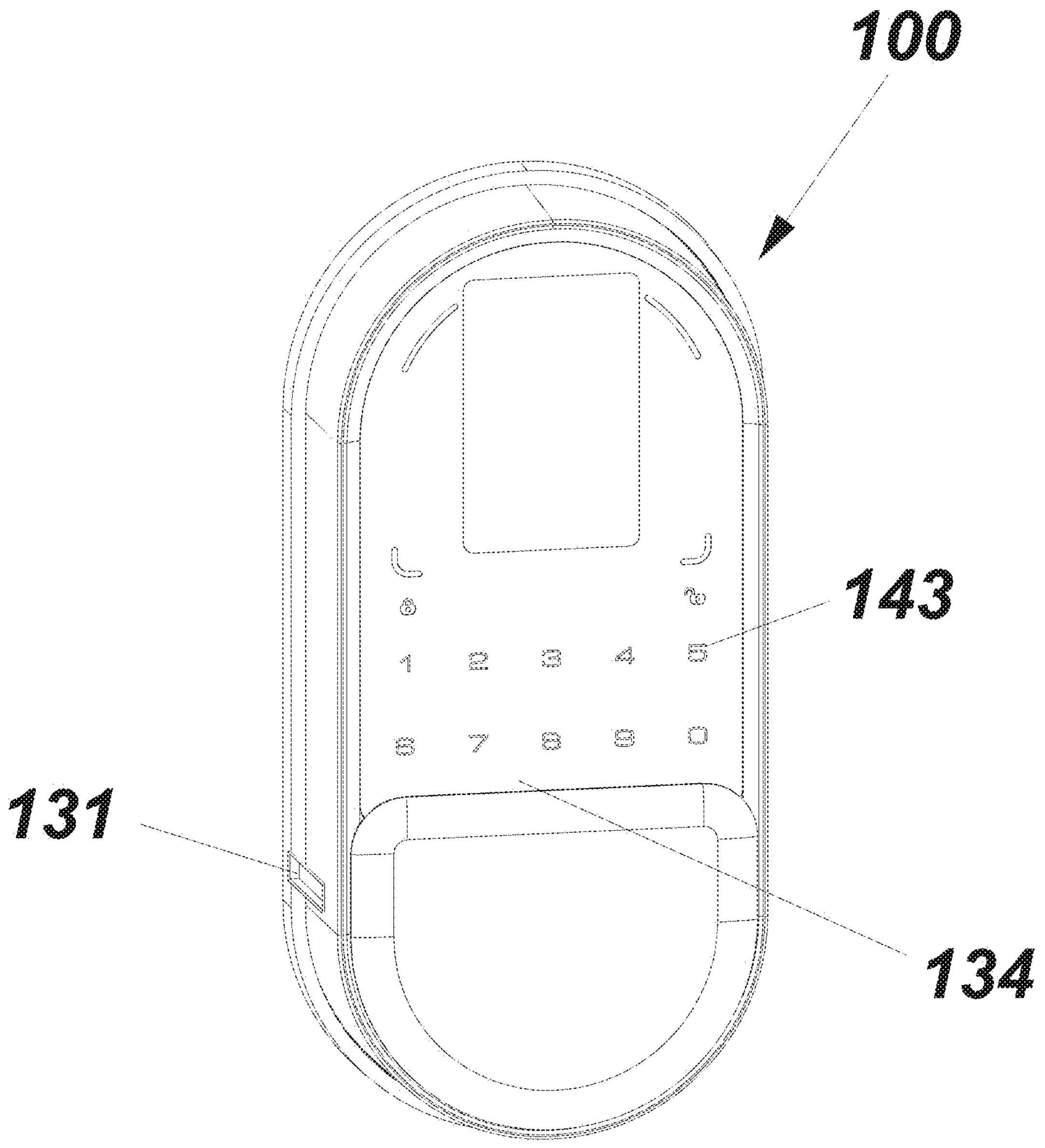
FIG. 5 is a top left perspective view of one embodiment of the door lock controller having a vein reader.
Figure 6:
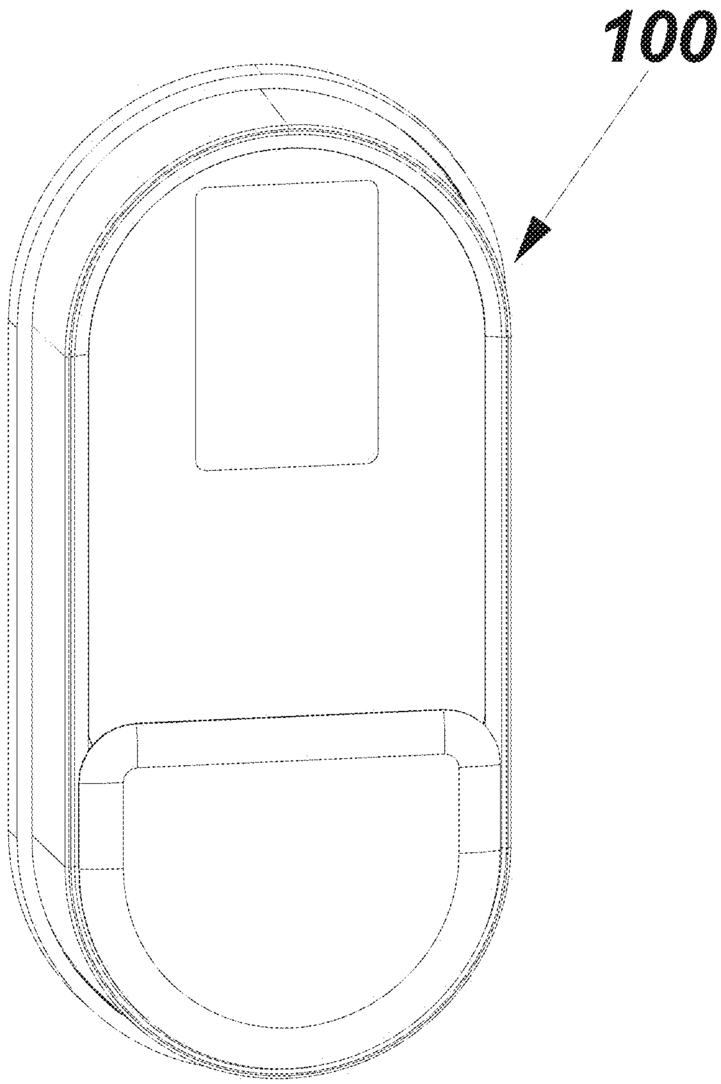
FIG. 6 is a top left perspective view of the door lock controller.
Figure 7:
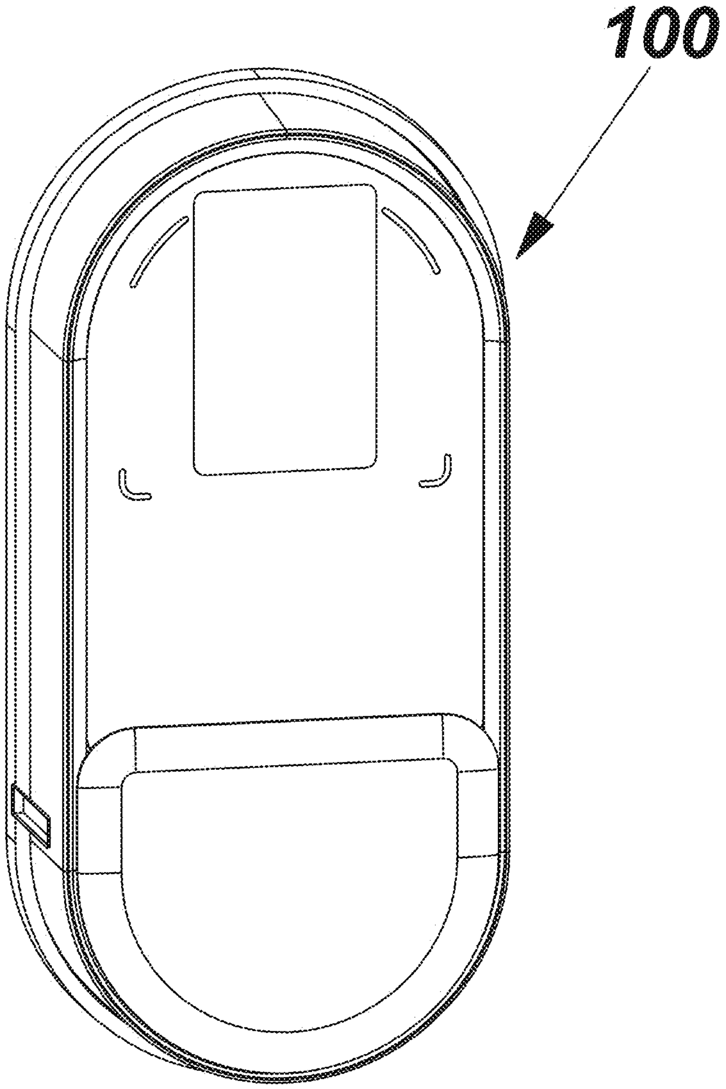
FIG. 7 is a top left perspective view of the door lock controller.

The camera 137 can be any suitable digital camera, as for example, a CMOS camera. The camera 137 is operable to provide image data to the door lock controller 100 for processing and possible long term storage to effect future matching and safe unlocking. An imaging function initiator operator, such as the switch 134, is pressed/activated by proximity to start operation of the door lock controller 100, the imaging module 130, and the radiation source module 128. It is to be understood that the switch 134 could serve this function. The switch 134 is connected to the door lock controller 100, which is operable to control camera operation and receive image data from the camera to form a vessel control image 116 which is compared to the authorized vein (or palm) image 114. The switch 134 could also be used to select whether the control module 132 is to be used to scan a palm or finger to input a vessel control image 116 for storage and later comparison, or for scanning to determine a match to an authorized vein image 114. A selected mode of operation can be indicated by lights 143 which may include indicia (FIG. 5). Further, for inputting a control image 116 for future image matching, a second switch 136, such as an actuator button inside the enclosure or safe (FIG. 4), can be provided and access achieved by using a keylock, described below, to open the enclosure or safe 10 and provide access to the second switch 136 to effect learning of a person's vessel image for image matching. In one embodiment, the imaging module 128 includes at least one light 41 that produces light in the visible spectrum, and is operable to have light therefrom pass through a second filter 52 to illuminate the palm or finger, making it visible to the camera. The second filter 52 is a photo filter and is operable to filter out near infrared light that has irradiated a palm or finger, but is operable to allow imaging of the irradiated vessels in the palm or finger by the camera.

A reflective light source may be provided and would be operable to provide light to illuminate the surface of a palm, allowing the camera to better record the palm or finger. Light from the reflective light source is preferably in the visible spectrum. The reflective light source directs light toward the palm or finger and preferably includes one or more lights. In this arrangement, the filter 52 would be positioned between the described camera and the user's palm or finger.

In use, a user's palm is placed onto or near the palm positioning posts 108 or the finger is placed upon the prongs 135 and actuates the switch 134, which in turn powers the lights which illuminate the palm or finger to determine its position, skew, pitch and rotation, and the camera 137, while providing image data to the door lock controller 100 which will adjust for the palm or finger position and rotation through its programming. The lights are then turned off, and the radiation source light is turned on. The radiation source light then provides a vessel image for the camera to start the scanning/matching process. The door lock controller 100 processes the image data from the infrared exposure for feature extraction, and determines if pre-set threshold values are met to determine if there is a match when the system is in matching mode. The door lock controller 100 can then adjust for the position skew, pitch and rotational angles if needed and determine if there is a match to a stored image; and, if there is a match, actuate a locking mechanism described below to unlock the door 22.

In the comparison to determine match/no match, the door lock controller 100, through its programming, carries out a multimode identification of the images after position normalization conversion. The image analysis and comparison flow includes first carrying out palm or finger elevation information, mean breadth and each regional luminance information; second, effecting noise reduction of the vessel image and carrying out spatial adjustment of the vessel image; third, normalizing the vessel image and adjusting for size difference; fourth, carrying out FFT (fast Fourier transformation) of the vessel image and obtaining characteristic values; and fifth, determining if there is a match or no match. If there is a match, the latching mechanism 28 of the door 22 is then actuated to unlock the enclosure or safe 10. This can be carried out via radio signal such as Bluetooth, ZIGBY chip or the like, or may be by hard wire. The finger and palm scanners can store a portion of the data inside of the door lock actuator which is positioned inside of the dwelling, wherein a hacker or the like gaining access to the circuitry of the door lock controller 100 cannot access the data stored inside of the door lock controller 100, which may include the data relating to scans of palms and fingers that are allowed entry to the enclosure or safe. This data can also be utilized as a secondary check, wherein the palm or finger scanner makes an initial determination if the vein scan is acceptable and the scan is rechecked against the data stored inside of the door lock actuator 14 before the lock mechanism 26 is unlocked to allow access to the safe. It should also be noted the since the palm or finger positioner can communicate via radio frequency, the door lock controller 100 can be utilized to open more than one door or it can be used by more than one user, where each user has access to individual doors where there are multiple doors. In this manner, one user can access one door while another user can be provided access to a different door or both doors. The remote access can be provided so long as the user is located sufficiently close to allow radio signals to be transferred to the lock or may in some embodiments be transferrable through an internet connection to a network for long distance remote operation.

The door lock controller 100 is connected to the dwelling or building 10 for operation of the lock mechanism 26, and includes a vein reader 12 that is provided with a radiation source module 112, an imaging module 128, and a palm positioner 106, operably associated with one another to provide biometric information for vessel control image 116 storage and matching to effect unlocking of the door 22.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A biometric door lock system for an enclosed space comprising: an enclosure (10) having a plurality of side walls (16), a floor (18) and a top panel (74), the side walls (16), floor (18) and top panel (74) are connected together to form a storage chamber, an opening (20) is provided in one of the side walls (16), floor (18) or top panel (74), a door (22) is moveably connected to the enclosure (10) for selectively covering the opening and to provide ingress and egress to the interior space of the storage chamber when in an open position, a lock mechanism (26) constructed and arranged to selectively lock and prevent the door (22) from being opened and to selectively unlock to allow access to the interior space upon identification of the user, the lock mechanism including a door lock controller (100), the door lock controller including a proximity switch (134) positioned to sense the position of the user's hand for initiating the imaging module (128) wherein the user need not contact the imaging module (128) to operate the lock mechanism (26) the lock controller including an imaging module (128) for identifying the user attempting to open the lock mechanism, the imaging module (128) mounted remote from the lock mechanism (26), the imaging module (128) electrically communicating with the lock mechanism (26) to provide user identification to the lock mechanism (26) for remote operation of the lock mechanism (26), the imaging module (128) including a light source for selectively directing light having an infrared or near infrared wavelength toward the user's hand causing the vessels in the hand to contrast with adjacent tissue, a camera (137) positioned in the imaging module (128) for taking an identification photographic image of the contrasted vessels for comparison to a vessel control photographic image (116) stored in the internal memory of the imaging module, wherein the door lock controller (100) processes the identification image data, wherein a match of the two contrasted identification photographic image and the vessel control photographic images causes the imaging module to electrically communicate with the lock mechanism (26) to unlock and allow access to the interior space of the enclosure (10).

2. The biometric door lock system for an enclosed space as claimed in claim 1 wherein the identification photographic image is of the user's palm veins and the vessel control photographic image is of the user's palm veins.

3. The biometric door lock system for an enclosed space as claimed in claim 1 wherein the identification photographic image is of the user's finger veins and the vessel control photographic image is of the user's finger veins.

4. The biometric door lock system for an enclosed space as claimed in claim 1 wherein the door (22) further includes a latch mechanism (28) for retaining the door (22) in a closed and unlocked condition and releasable by rotation of a handle (30) to allow the unlocked door to be opened.

5. The biometric door lock system for an enclosed space as claimed in claim 1 wherein the lock mechanism (26) includes a palm positioner (106) for controlling the angle of pitch and skew, as well as the rotational angle of the palm while being imaged.

6. The biometric door lock system for an enclosed space as claimed in claim 5 wherein the palm positioner (106) includes palm positioning posts (108) that cooperate with the user's hand to position the palm (120) in a predetermined position.

7. The biometric door lock system for an enclosed space as claimed in claim 1 wherein the palm positioner (106) is constructed to include a data port (118) that is suitably constructed to cooperate with a cord (122) for connection to the lock mechanism (26) to provide operational control of the lock actuator (14).

8. The biometric door lock system for an enclosed space as claimed in claim 1 wherein the imaging module (128) communicates with the lock mechanism (26) via radio signals.

9. The biometric door lock system for an enclosed space as claimed in claim 8 wherein the palm positioner (106) is constructed to include a data port (118) that is suitably constructed to cooperate with a dongle (34) for radio connection to the lock mechanism (26) to provide operational control of the lock actuator (14).

10. The biometric door lock system for an enclosed space as claimed in claim 8 wherein vessels in the hand are imaged using infrared or near infrared light having a wavelength from 750 nanometers to 950 nanometers.

11. The biometric door lock system for an enclosed space as claimed in claim 1 wherein the imaging module (128) stores a plurality of vessel control images (116) within an internal memory for comparison to an authorized vein image (114) to release the lock mechanism (26).

12. The biometric door lock system for an enclosed space as claimed in claim 10 wherein the infrared or near infrared light having a wavelength from 750 nanometers to 950 nanometers is provided by directing light having a visible spectrum through an optical filter (51) configured for near infrared light transmission, wherein the infrared or near infrared light passes through the optical filter (51).

13. The biometric door lock system for an enclosed space as claimed in claim 11 wherein door lock controller (100) processes the identification photographic image data and determines if pre-set threshold values are met to determine if there is a match to a stored vessel control photographic identification image (116) to operate the locking mechanism when a match is found.

14. The biometric door lock system for an enclosed space as claimed in claim 1 wherein the door lock controller (100) is constructed and arranged to electrically communicate with more than one locking mechanism (26).

15. The biometric door lock system for an enclosed space as claimed in claim 1 wherein the door lock controller (100) is constructed and arranged to store biometric information from more than one user in the form of photographic control images (116), and wherein the lock controller (100) is constructed and arranged to electrically communicate with more than one locking mechanism (26), wherein the lock controller may cause a different locking mechanism(s) to operate based upon the user.

* * * * *